United States Patent
Tortora et al.

(10) Patent No.: US 12,481,296 B2
(45) Date of Patent: Nov. 25, 2025

(54) DEVICE AND METHOD FOR AUTONOMOUS MANAGEMENT OF A DRONE

(71) Applicant: ABZERO SRL, Pisa (IT)

(72) Inventors: Giuseppe Roberto Tortora, Pisa (IT); Donatello Amicone, Campobasso (IT); Andrea Cannas, Lotzorai (IT)

(73) Assignee: ABZERO SRL, Pisa (IT)

( * ) Notice: Subject to any disclaimer, the term of this patent is extended or adjusted under 35 U.S.C. 154(b) by 17 days.

(21) Appl. No.: 18/286,105

(22) PCT Filed: Apr. 7, 2022

(86) PCT No.: PCT/IB2022/053280
§ 371 (c)(1),
(2) Date: Oct. 6, 2023

(87) PCT Pub. No.: WO2022/215033
PCT Pub. Date: Oct. 13, 2022

(65) Prior Publication Data
US 2024/0201705 A1 Jun. 20, 2024

(30) Foreign Application Priority Data
Apr. 7, 2021 (IT) .................. 102021000008684

(51) Int. Cl.
*G05D 1/654* (2024.01)
*G05D 1/227* (2024.01)
(Continued)

(52) U.S. Cl.
CPC .......... *G05D 1/6546* (2024.01); *G05D 1/2274* (2024.01); *G05D 1/617* (2024.01);
(Continued)

(58) Field of Classification Search
None
See application file for complete search history.

(56) References Cited

U.S. PATENT DOCUMENTS

| | | | |
|---|---|---|---|
| 10,889,374 B1 | 1/2021 | Baltrusch et al. | |
| 2017/0179582 A1* | 6/2017 | Spall | H01Q 1/28 |

(Continued)

*Primary Examiner* — Jelani A Smith
*Assistant Examiner* — Davin Seol
(74) *Attorney, Agent, or Firm* — Maschoff Brennan

(57) ABSTRACT

An intelligent device for autonomous navigation of a drone comprising a control unit arranged to communicate with a remote-control station by a wireless connection, acquire a mission route γ that the drone is arranged to follow to reach a desired destination, the mission route γ being defined by means of coordinates $x_m(t)$, $y_m(t)$, $z_m(t)$ with respect to a reference system $S(x,y,z)$, periodically acquire values $x_d$, $y_d$, $z_d$ corresponding to the components of the spatial position, values $v_x$, $v_y$, $v_z$ corresponding to the components of the speed and values $a_x$, $a_y$, $a_z$ corresponding to the components of the acceleration. Furthermore, in the event that a predetermined kinematic condition occurs, the control unit is arranged to check the status of the wireless connection with the remote-control station and, in the event that the wireless connection is active, send an alarm signal to the remote-control station and wait a response time $t_r$. [FIG. 1]

8 Claims, 2 Drawing Sheets

(51) Int. Cl.
  *G05D 1/617* (2024.01)
  *H04W 4/40* (2018.01)
  *H04W 24/08* (2009.01)
  *B64U 10/13* (2023.01)
  *G05D 109/20* (2024.01)
  *G05D 111/30* (2024.01)

(52) U.S. Cl.
  CPC ............. *H04W 4/40* (2018.02); *H04W 24/08* (2013.01); *B64U 10/13* (2023.01); *B64U 2201/10* (2023.01); *G05D 2109/20* (2024.01); *G05D 2111/30* (2024.01)

(56) References Cited

U.S. PATENT DOCUMENTS

| | | | |
|---|---|---|---|
| 2018/0074486 A1* | 3/2018 | Krishnamoorthy | G08G 5/25 |
| 2019/0101934 A1* | 4/2019 | Tuukkanen | G05D 1/101 |
| 2021/0064025 A1 | 3/2021 | Sant et al. | |
| 2021/0309122 A1* | 10/2021 | Wake | B60L 58/22 |
| 2021/0350713 A1* | 11/2021 | Van Meeteren | G05D 1/0022 |
| 2022/0141685 A1* | 5/2022 | Ergen | H04W 28/084 |
| | | | 370/252 |
| 2022/0349718 A1* | 11/2022 | Nardimon | B60L 58/13 |
| 2022/0357162 A1* | 11/2022 | Okuda | G08G 1/0969 |

* cited by examiner

DEVICE AND METHOD FOR AUTONOMOUS MANAGEMENT OF A DRONE

FIELD OF THE INVENTION

The present invention relates to the sector of navigation and the transport of special loads by means of drones.

In particular, the invention relates to an intelligent device for autonomous navigation of a drone in the absence of connection with the remote pilot.

Description of the Prior Art

As well known, current drones have various safety systems to control navigation and prevent the vehicle from being lost.

Typically, these safety systems come into operation in the event of a loss of the radio connection, a critical level of energy autonomy or deviation from the route set for the mission. In this case, the navigation mode and the configuration of the parameters set at the start of the mission are changed, making the drone enter an autonomous navigation mode, which remains until the pilot intervenes remotely.

Generally, this autonomous navigation mode is predefined at the beginning of the mission and simply involves returning to the launch base ("Return To Launch" mode) or landing at a predefined landing point along the route ("Safety Check Point").

An example of such autonomous navigation is shown in U.S. Pat. No. 10,889,374B1, where, in the event of a loss of the radio connection, the aircraft is programmed to reach a first or a second "waypoint". Another example is shown in US2021064025A1.

However, such systems do not involve any assessment of the feasibility of completing the mission or of safe flight conditions. This means that a drone that has almost finished its mission can be recalled to the base, when it would have the energy autonomy to continue along the path. Furthermore, the automatic return to the base is carried out through a preset straight flight which can lead to damage to the drone where the return path has obstacles, such as trees or buildings.

SUMMARY OF THE INVENTION

It is therefore a feature of the present invention to provide an intelligent device for the autonomous navigation of a drone which allows to autonomously control the navigation of the drone when predetermined critical conditions occur.

It is, furthermore, a feature of the present invention to provide such an intelligent device that can independently evaluate whether or not to complete the mission in case of loss of connection with the control station.

It is a further feature of the present invention to provide such an intelligent device which can identify alternative trajectories to the preset route to reach the desired destination.

These and other objects are achieved by an intelligent device for autonomous navigation of a drone, the drone comprising at least one motor for allowing the in-flight movement of the drone, the intelligent device comprising a control unit arranged, in use, to be connected to the or to each motor in order to control the navigation of the drone, the control unit being also arranged to:

- communicate with a remote-control station by a wireless connection;
- acquire a mission route $\gamma$ that the drone is arranged to follow to reach a desired destination, the mission route $\gamma$ being defined by means of coordinates $x_m(t)$, $y_m(t)$, $z_m(t)$ with respect to a reference system $S(x,y,z)$;
- periodically acquire values $x_d$, $y_d$, $z_d$ corresponding to the components of the spatial position of the drone with respect to the reference system $S(x,y,z)$;
- periodically acquire values $v_x$, $v_y$, $v_z$ corresponding to the components of the speed of the drone with respect to the reference system $S(x,y,z)$;
- periodically acquire values $a_x$, $a_y$, $a_z$ corresponding to the components of the acceleration of the drone with respect to the reference system $S(x,y,z)$;

whose main feature is that said control unit is also arranged to:

- check the status of the wireless connection with the remote-control station, in the event that at least one of the following conditions occurs:
  - at time $t^*$, $x_d > x_m(t^*) + d_x$ and/or $y_d > y_m(t^*) + d_y$ and/or $z_d > z_m(t^*) + d_z$;
  - $v_x > v^*_x$ and/or $v_y > v^*_y$ and/or $v_z > v^*_z$;
  - $a_x > a^*_x$ and/or $a_y > a^*_z$ and/or $a_z > a^*_z$;
  - where $d_x$, $d_y$, $d_z$, $v^*_x$, $v^*_y$, $v^*_z$, $a^*_x$, $a^*_y$, $a^*_z$ are predetermined values;
- in the event that the wireless connection is active, send an alarm signal to the remote-control station and wait a response time $t_r$;
- in the event that the wireless connection is not active or in the event that there is no response by the remote-control station within the response time $t_r$, activate an emergency navigation mode where the control unit is arranged to:
  - acquire a value $E_{res}$ corresponding to the energy available on board of the drone;
  - calculate a value $E_{mis}$ corresponding to the energy required by the drone to reach the desired destination following the mission route $\gamma$;
  - in the event that $E_{res} \geq k_{mis} * E_{mis}$, where $k_{mis}$ is a coefficient greater than or equal to 1, control the navigation of the drone along the mission route $\gamma$;
  - in the event that $E_{res} < k_{mis} * E_{mis}$, control the navigation of the drone along a route alternative to the mission route $\gamma$ to bring the drone to perform a safe landing.

In particular, to calculate value $E_{mis}$, the control unit is arranged to carry out an estimate of the speed of the wind acting along the mission route $\gamma$ up to the desired destination.

In particular, the speed of the wind is estimated on the basis of at least one of the following sources:

- wind map made on a statistical basis;
- weather forecasts on the internet;
- data provided by meteorological stations located near the mission route $\gamma$;
- data provided before the start of the mission.

Alternatively, the speed of the wind along the mission route $\gamma$ can be estimated by measuring the wind speed acting on the drone, for example through the use of sensors placed on the drone itself or through the difference in energy consumption that the motors produce for keeping the drone in place.

Advantageously, in the event that $E_{res} < k_{mis} * E_{mis}$, the control unit is arranged to:

- carry out an estimate of the speed of the wind acting along a plurality of routes $\gamma_i$ alternative to the mission route $\gamma$ and able to allow the drone to reach the desired destination;

calculate, for each route $\gamma_i$, a value $E_{mis}^i$ corresponding to the energy required by the drone to reach the desired destination following the route $\gamma_i$;

identify the lower value $E^*_{mis}$ between the energy values $E_{mis}^i$, the lower value $E^*_{mis}$ being associated with a route $\gamma^*$;

in the event that $E_{res} \geq k_{mis} * E_{mis}$, control the navigation of the drone along the route $\gamma^*$ up to the desired destination.

Alternatively or after the step of determining the alternative routes, in the event that $E_{res} < k_{mis} * E_{mis}$, the control unit is arranged to:

calculate a value $E_{cp}$ corresponding to the energy required by the drone to reach at least one checkpoint near the mission route $\gamma$;

in the event that $E_{res} \geq k_{cp} * E_{cp}$, where $k_{cp}$ is a coefficient greater than or equal to 1, control the navigation of the drone along a mission route alternative $\tilde{\gamma}$ to bring the drone to land at the checkpoint.

In particular, in the event that $E_{res} < k_{cp} * E_{cp}$, the control unit is arranged to control the navigation of the drone to perform an emergency landing.

In particular, in the event that on board of the drone there is a refrigerant device for maintaining the temperature of the transported load, the calculation of the values of $E_{mis}$, $E_{mis}$ and $E_{cp}$ comprises the step of evaluation of the consumption of such refrigerant device for maintaining the temperature.

Advantageously, the response time $t_r$ is a predetermined time. In particular, $t_r = 3$ s Alternatively, the response time $t_r$ is calculated by the control unit based on a response speed of the wireless connection.

In particular, $t_r$ is calculated through the use of pings between the intelligent device and the remote-control station according to the equation:

$$t_r = \overline{t_p} + \beta * \sigma_p$$

where $\overline{t_p}$ is the mean of the ping round-trip times of the wireless connection, $\beta$ is a continuous probability distribution value and $\sigma_p$ is the standard deviation of the ping round-trip times.

Advantageously, in the emergency navigation mode the control unit is arranged to check the status of the wireless connection for a time $t_s$ with a search frequency $f_1$ and wherein, after the time $t_s$, the control unit is arranged to check the status of the wireless connection with a search frequency $f_2 < f_1$.

In particular, the time $t_s$ can be a predetermined time or can be calculated on the basis of the overall time necessary to complete the emergency navigation. For example, $t_s$ can be a predetermined percentage of the estimated time required to complete reaching the desired destination or to make an early landing in the emergency navigation mode.

Alternatively, or in combination, the control unit can switch from the search frequency $f_1$ to the search frequency $f_2$ when the value $E_{res}$ falls below a predetermined threshold or upon reaching a predetermined percentage of the section to be carried out to complete the emergency navigation.

In this way, the control unit can gradually reduce the energy consumption used to search for the wireless connection signal as emergency navigation approaches its end. For example, after a certain time or a certain percentage of the route completed in the emergency navigation mode, the control unit can completely stop checking the connection status, as resuming navigation remotely would no longer be convenient.

In particular, when the drone enters the landing phase during emergency navigation, this procedure cannot be interrupted by the remote-control station. This is because, once the landing phase has begun, it is no longer convenient to interrupt this phase, but rather complete the landing and perform a new take-off.

Advantageously, the intelligent device comprises furthermore:

locating sensors arranged to measure the components $x_d$, $y_d$, $z_d$ of the spatial position of the drone with respect to the reference system $S(x,y,z)$;

speed sensors arranged to measure the components $v_x$, $v_y$, $v_z$ of the speed of the drone with respect to the reference system $S(x,y,z)$;

acceleration sensors arranged to measure the components $a_x$, $a_y$, $a_z$ of the acceleration of the drone with respect of the reference system $S(x,y,z)$.

In particular, the intelligent device also comprises an antenna arranged to provide the wireless connection between the intelligent device and the remote-control station.

In particular, the antenna wireless can also establish an internet connection.

BRIEF DESCRIPTION OF THE DRAWINGS

The invention will be now shown with the following description of some exemplary embodiments, exemplifying but not limitative, with reference to the attached drawings in which.

DESCRIPTION OF SOME PREFERRED EXEMPLARY EMBODIMENTS

The intelligent device 100 for autonomous navigation of a drone, according to the present invention, comprises a control unit arranged, in use, to be connected to the motors of the drone in order to control the navigation of the drone itself.

In particular, the intelligent device 100 can be a device external to the drone and be arranged integrally with it by connecting the control unit of the intelligent device 100 with the on-board computer of the drone. In doing so, the intelligent device 100 can be used on existing drones.

Figure 2:
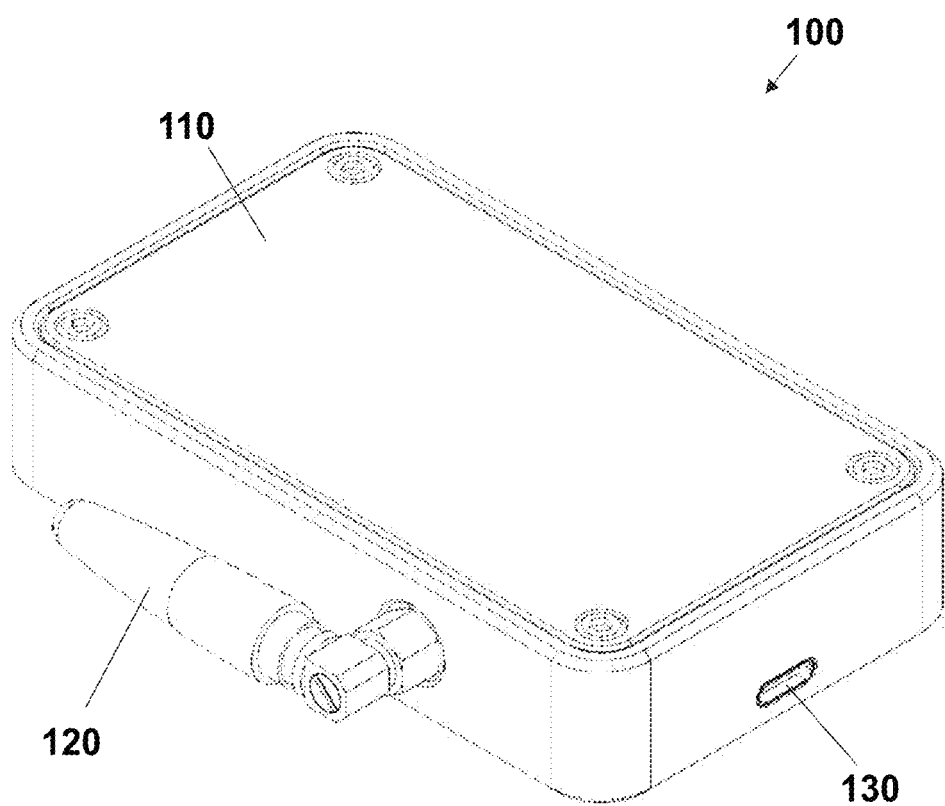
FIG. 2 shows, by way of example, a possible embodiment of the intelligent device for autonomous navigation of a drone, according to the present invention.

FIG. 2 shows, by way of example, a possible embodiment of the intelligent device 100, in case that it is a device external to the drone. In this embodiment, the intelligent device 100 comprises a case 110, in which the control unit is housed, an antenna 120 and a connection port 130 for the drone.

Alternatively, the intelligent device 100 can be directly integrated into the drone and the control unit can be the only on-board computer of the drone.

In particular, the control unit is arranged, preferably before starting the mission, to acquire the mission route $\gamma$ that the drone must follow to reach a desired destination. Such mission route $\gamma$ is defined by means of coordinates $x_m(t)$, $y_m(t)$, $z_m(t)$ with respect to the reference system $S(x,y,z)$.

Furthermore, the control unit is arranged to communicate with a remote-control station by a wireless connection. In particular, the intelligent device 100 can comprise an antenna arranged to provide this wireless connection. Alternatively, the intelligent device 100 can be configured for connecting the control unit to a wireless antenna placed on the drone.

Advantageously, the control unit is also suitable for connecting to an internet network.

Figure 1:
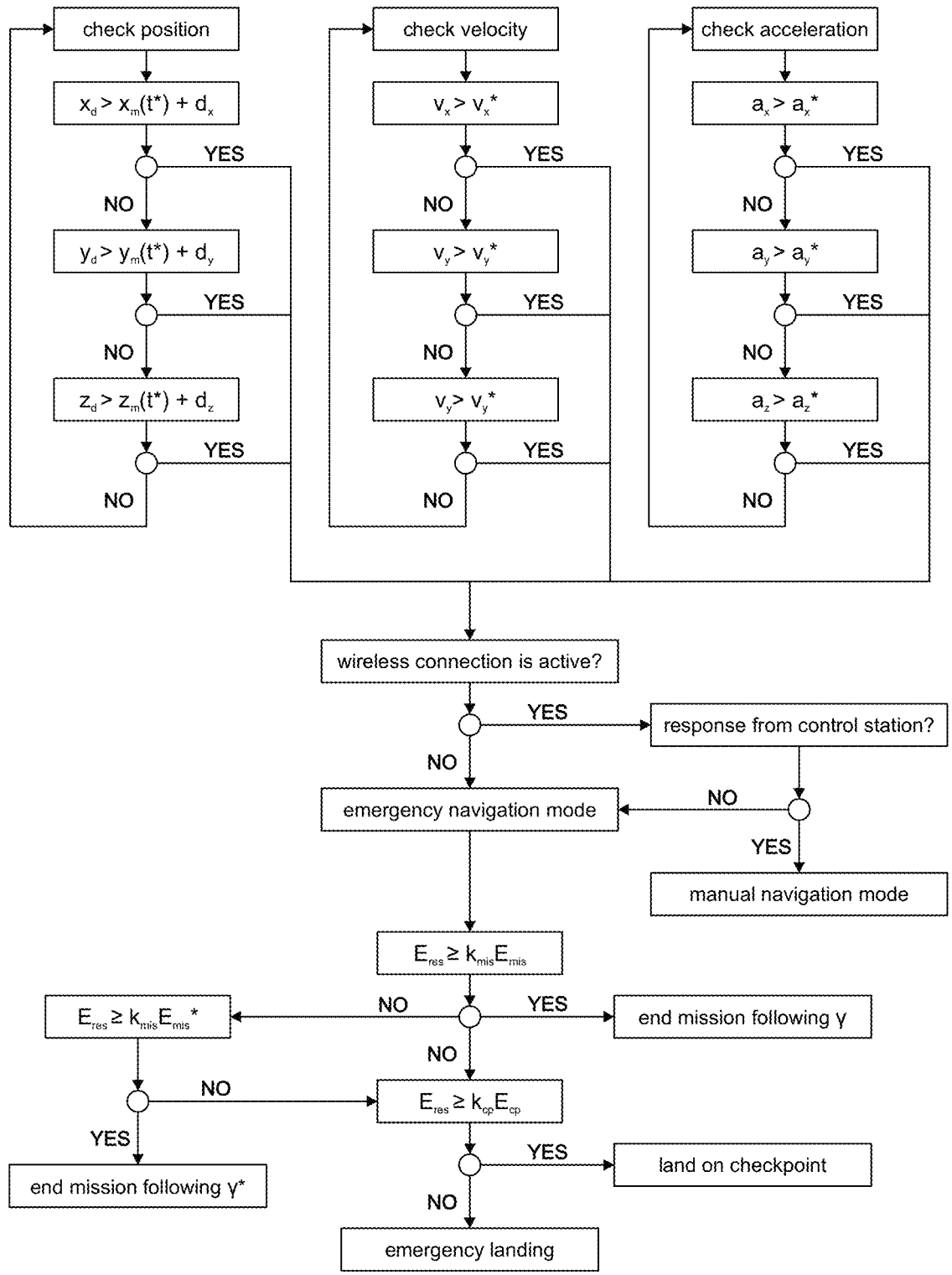
FIG. 1 shows a preferred solution of the flow chart followed by the control unit of the intelligent device for autonomous navigation according to the present invention.

The flow-sheet of FIG. 1 shows the following steps of a possible algorithm followed by the control unit for the intelligent device 100 for autonomous navigation of a drone, according to the present invention.

Once the drone flight mission has started, the control unit of the intelligent device 100 is arranged to periodically acquire the values $x_d, y_d, z_d, v_x, v_y, v_z, a_x, a_y, a_z$ corresponding to the components, respectively, of position, speed and acceleration of the drone with respect to a reference system $S(x,y,z)$.

In particular, such components of position, speed and acceleration of the drone can be determined by respective locating means and speed and acceleration sensors present in the device. Alternatively, the control unit of the intelligent device 100 can connect to locating means and speed and acceleration sensors on the drone.

In this way, the control unit periodically checks the position, speed and acceleration of the drone, to detect the possible presence of an anomaly during the flight.

In particular the anomaly is detected in the event that at least one of the following conditions occurs:

at time $t^*$, $x_d > x_m(t^*) + d_x$ and/or $y_d > y_m(t^*) + d_y$ and/or $z_d > z_m(t^*) + d_z$;

$v_x > v^*_x$ and/or $v_y > v^*_y$ and/or $v_z > v^*_z$;

$a_x > a^*_x$ and/or $a_y > a^*_y$ and/or $a_z > a^*_z$;

where $d_x, d_y, d_z, v^*_x, v^*_y, v^*_z, a^*_x, a^*_y, a^*_z$ are predetermined values.

The occurrence of the first condition means that the drone has moved excessively from the mission route $\gamma$ along at least one of the spatial coordinates which, at the time $t^*$, should be $x_m(t^*), y_m(t^*), z_m(t^*)$.

The occurrence of at least one of the second and third conditions means that the speeds or accelerations of the drone are significantly different from the expected values.

By periodically checking the conditions on the kinematic components described above, it is possible to intervene promptly in the event that the drone loses speed or is moved by the wind or suffers a sudden change in altitude, for example due to impact with an obstacle.

If at least one of the conditions described is verified, the control unit proceeds with the verification of the wireless connection status with the remote-control station. If the connection is active, the control unit sends an alarm signal and waits for a response from the remote-control station for a time $t_r$.

In particular, the response time $t_r$ can be a predetermined time, for example $t_r=3$ s, or can be a time calculated dynamically by the control unit based on the response speed of the wireless connection.

Advantageously, $t_r$ can be calculated using pings between the intelligent device 100 and the remote-control station according to the equation:

$$t_r = \bar{t}_p + \beta^* \sigma_p$$

where $\bar{t}_p$ is the mean of the ping round-trip times of the wireless connection, $\beta$ is a continuous probability distribution value and $\sigma_p$ is the standard deviation of the ping round-trip times.

In the event that the control station responds within the time $t_r$, navigation is left in manual mode and is managed remotely by the control station.

In the event, however, that the wireless connection is not active or that the control station does not respond within the time $t_r$, the control unit enters the emergency navigation mode and begins to control the navigation of the drone.

In this way, the intelligent device 100 according to the present invention can act promptly and autonomously both in the event of an unexpected flight or adverse weather conditions, and in the event of loss of the wireless connection, and in the event of both conditions.

In particular, according to a preferred embodiment of the invention, once it enters the emergency navigation mode, the control unit checks the value $E_{res}$ corresponding to the energy available on board of the drone.

In particular, the available energy is electricity that can be stored in one or more batteries. In addition, the electricity can come from solar panels or other energy sources that allow the batteries to be recharged. Alternatively, in the event that the drone is moved by non-electric motors, the available energy is measured on the basis of the energy resource used. For example, in the event that the drone uses heat engines, the available energy is measured on the basis of the fuel present on board. In the case of hybrid drones, the energy is measured on the basis of all the energy sources present on board.

The control unit then proceeds to calculate the value $E_{mis}$ corresponding to the energy required by the drone to reach the desired destination following the mission route $\gamma$.

In particular, to calculate the value $E_{mis}$, the control unit is arranged to perform both a calculation of the nominal consumption of the motors for carrying out the mission route $\gamma$ both an estimate of the speed of the wind acting along this mission route $\gamma$. In this way, the control unit can have a more accurate estimate of the real energy that will be spent to maintain the flight path by counterbalancing the action of the wind.

For example, the speed of the wind can be estimated on the basis of at least one of the following sources:

wind map made on a statistical basis;

weather forecasts on the internet;

data provided by meteorological stations located near the mission route $\gamma$;

data provided before the start of the mission.

The control unit can also draw on other sources or make an estimate based on the wind speed acting on the drone. In particular, the speed acting on the drone can be measured using sensors, for example anemometers, or it can be calculated through the difference in energy consumption that the motors produce to keep the drone along a certain trajectory.

In the event that the condition $E_{res} \geq k_{mis}^* E_{mis}$ occurs, it means that the mission can be completed correctly and therefore controls the navigation of the drone along the mission route $\gamma$ up to reaching the desired destination.

The coefficient $k_{mis}$ is a coefficient greater than or equal to 1 that allows you to manage the safety margin on the control unit estimate. This coefficient can be predetermined or determined in real time by the control unit. For example, the coefficient $k_{mis}$ can be determined by the control unit based on the accuracy of the source from which the wind conditions along the route to be travelled are derived. If the source is considered very reliable, for example a real-time forecast of weather stations located very close to the mission route $\gamma$, the coefficient $k_{mis}$ may have a lower value than in the situation where the source is considered unreliable, such as for example a statistical wind map.

If, on the other hand, the condition $E_{res}<k_{mis}*E_{mis}$ occurs, the control unit can check the position of at least one checkpoint near the mission route γ. The positions of these checkpoints can be acquired by the control unit before the mission or even during the mission.

The control unit then proceeds to calculate a value $E_{cp}$ corresponding to the energy required by the drone to reach the closest checkpoint among those available.

In the event that the condition $E_{res} \geq k_{cp}*E_{cp}$ occurs, the control unit controls the navigation of the drone along an alternative mission route γ to bring the drone to land at the checkpoint. For the coefficient $k_{cp}$ the same considerations made for the coefficient $k_{mis}$ apply.

If, on the other hand, the condition $E_{res}<k_{cp}*E_{cp}$ occurs, the control unit is arranged to control the navigation of the drone to perform an emergency landing.

According to an embodiment of the invention, when the condition $E_{res}<k_{mis}*E_{mis}$ occurs, before verifying the position of a checkpoint, the control unit can check whether an alternative route to the mission route is available which involves a lower energy consumption.

In this situation the control unit is arranged to:
carry out an estimate of the speed of the wind acting along a plurality of routes $\gamma_i$ alternative to the mission route γ and able to allow the drone to reach said desired destination;
calculate, for each route $\gamma_i$, a value $E_{mis}^i$ corresponding to the energy required by the drone to reach the desired destination following the route $\gamma_i$;
identify the lower value $E^*_{mis}$ between the energy values $E_{mis}^i$ associating it to a route γ*;
in the event that $E_{res} \geq k_{mis}*E^*_{mis}$, control the navigation of the drone along the route γ* up to the desired destination;
in the event that $E_{res}<k_{mis}*E^*_{mis}$, proceed with the attempt of landing near a checkpoint.

Also in this case, the control unit can estimate the wind speed by drawing on the sources listed above.

The control unit can be set to carry out or not carry out in a predetermined way the step of computing the energy values $E_{mis}^i$ associated with the routes $\gamma_i$. Alternatively, the implementation of this step can be decided by the control unit on the basis of the available data. For example, the control unit may decide to carry out this step in the event that a source deemed sufficiently reliable is available for estimating the wind speed.

Advantageously, in the event that a refrigerant device is present on board the drone for maintaining the temperature of the transported load, the calculation of the values of $E_{mis}$, $E_{mis}^i$ and $E_{cp}$ comprises the step of evaluation of the consumption of such refrigerant device for maintaining the temperature.

In particular, during the emergency navigation mode, the control unit is arranged to check the status of the wireless connection for a time $t_s$ with a search frequency $f_1$ and, after the time $t_s$, is arranged to check the status of the wireless connection with a search frequency $f_2<f_1$.

In particular, the time $t_s$ can be a predetermined time or can be calculated on the basis of the overall time necessary to complete the emergency navigation. For example, $t_s$ can be a predetermined percentage of the estimated time required to complete reaching the desired destination or to make an early landing in the emergency navigation mode.

Alternatively, or in combination, the control unit can move from the search frequency $f_1$ to the search frequency $f_2$ when the value $E_{res}$ falls below a predetermined threshold or upon reaching a predetermined percentage of the section to be carried out to complete the emergency navigation.

In this way, the control unit can gradually reduce the energy consumption used to search for the wireless connection signal as emergency navigation approaches its end. For example, after a certain time or a certain percentage of the route completed in the emergency navigation mode, the control unit can completely stop checking the connection status, as resuming navigation remotely would no longer be convenient.

In particular, when the drone enters the landing phase during emergency navigation, this procedure cannot be interrupted by the remote-control station. This is because, once the landing phase has begun, it is no longer convenient to interrupt this phase, but rather complete the landing and perform a new take-off.

The foregoing description exemplary embodiments of the invention will so fully reveal the invention according to the conceptual point of view, so that others, by applying current knowledge, will be able to modify and/or adapt for various applications such embodiment without further research and without parting from the invention, and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. An intelligent device for autonomous navigation of a drone, said drone comprising at least one motor suitable for allowing an in-flight movement of said drone, said intelligent device comprising a control unit arranged, in use, to be connected to said or each at least one motor in order to control navigation of said drone, said control unit being also arranged to:
communicate with a remote-control station by a wireless connection;
acquire a mission route γ that said drone is arranged to follow to reach a desired destination, said mission route γ being defined by means of coordinates $x_m(t)$, $y_m(t)$, $z_m(t)$ with respect to a reference system $S(x,y,z)$;
periodically acquire values $x_d$, $y_d$, $z_d$ corresponding to components of a spatial position of said drone with respect to said reference system $S(x,y,z)$;
periodically acquire values $v_x$, $v_y$, $v_z$ corresponding to components of a speed of said drone with respect to said reference system $S(x,y,z)$;
periodically acquire values $a_x$, $a_y$, $a_z$ corresponding to components of an acceleration of said drone with respect to said reference system $S(x,y,z)$;
said control unit being also arranged to:
check a status of said wireless connection with said remote-control station, in an event that at least one of the following conditions occurs:
at time t*, $x_d>x_m(t^*)+d_x$ and/or $y_d>y_m(t^*)+d_y$ and/or $z_d>z_m(t^*)+d_z$;
$v_x>v^*_x$ and/or $v_y>v^*_y$ and/or $v_z>v^*_z$;
$a_x>a^*_x$ and/or $a_y>a^*_y$ and/or $a_z>a^*_z$;
where $d_x$, $d_y$, $d_z$, $v^*_x$, $v^*_y$, $v^*_z$, $a^*_x$, $a^*_y$, $a^*_z$ are predetermined values;
in an event that said wireless connection is active, send an alarm signal to said remote-control station and wait a response time $t_r$;

in an event that said wireless connection is not active or in an event that there is no response from said remote-control station within said response time $t_r$, activate an emergency navigation mode wherein said control unit is arranged to:
  acquire a value $E_{res}$ corresponding to an energy available on board of said drone;
  calculate a value $E_{mis}$ corresponding to an energy required by said drone to reach said desired destination following said mission route $\gamma$;
  in an event that $E_{res} \geq k_{mis}*E_{mis}$, where $k_{mis}$ is a coefficient greater than or equal to 1, control the navigation of said drone along said mission route $\gamma$;
  in an event that $E_{res} < k_{mis}*E_{mis}$, control the navigation of said drone along a route alternative to said mission route $\gamma$ to bring said drone to perform a safe landing;
wherein, in the event that $E_{res} < k_{mis}*E_{mis}$, said control unit is also arranged to:
  carry out an estimate of a speed of a wind acting along a plurality of routes $\gamma_i$ alternative to said mission route $\gamma$ and able to allow said drone to reach said desired destination;
  calculate, for each route $\gamma_i$, a value $E_{mis}^i$ corresponding to an energy required by said drone to reach said desired destination following said route $\gamma_i$;
  identify a lower value $E^*_{mis}$ between said energy values $E_{mis}^i$, said lower value $E^*_{mis}$ being associated with a route $\gamma^*$;
  in an event that $E_{res} \geq k_{mis}*E^*_{mis}$, control the navigation of said drone along said route $\gamma^*$ up to said desired destination.

2. The intelligent device for autonomous navigation of the drone, according to claim 1, wherein to calculate said value $E_{mis}$, said control unit is arranged to carry out an estimate of a speed of a wind acting along said mission route $\gamma$.

3. The intelligent device for autonomous navigation of the drone, according to claim 1, wherein, in the event that $E_{res} < k_{mis}*E_{mis}$, said control unit is arranged to:
  calculate a value $E_{cp}$ corresponding to an energy required by said drone to reach at least one checkpoint near said mission route $\gamma$;
  in an event that $E_{res} \geq k_{cp}*E_{cp}$, where $k_{cp}$ is a coefficient greater than or equal to 1, control the navigation of said drone along an alternative mission route $\gamma$ to bring said drone to land at said checkpoint.

4. The intelligent device for autonomous navigation of the drone, according to claim 3, wherein, in an event that $E_{res} < k_{cp}*E_{cp}$, said control unit is arranged to control the navigation of said drone to perform an emergency landing.

5. The intelligent device for autonomous navigation of the drone, according to claim 1, wherein said response time $t_r$ is calculated by said control unit based on a response speed of said wireless connection.

6. The intelligent device for autonomous navigation of the drone, according to claim 1, wherein in said emergency navigation mode said control unit is arranged to check the status of said wireless connection for a time $t_s$ with a search frequency $f_1$ and wherein, after said time $t_s$, said control unit is arranged to check the status of said wireless connection with a search frequency $f_2 < f_1$.

7. The intelligent device for autonomous navigation of the drone, according to claim 1, wherein said intelligent device comprises furthermore:
  locating sensors arranged to measure the components $x_d$, $y_d$, $z_d$ of the spatial position of said drone with respect to said reference system $S(x,y,z)$;
  speed sensors arranged to measure the components $v_x$, $v_y$, $v_z$ of the speed of said drone with respect to said reference system $S(x,y,z)$;
  acceleration sensors arranged to measure the components $a_x$, $a_y$, $a_z$ of the acceleration of said drone with respect to said reference system $S(x,y,z)$.

8. The intelligent device for autonomous navigation of the drone, according to claim 1, wherein said intelligent device also comprises an antenna arranged to provide said wireless connection between said intelligent device and said remote-control station.

* * * * *